United States Patent [19]

Bernstein et al.

[11] Patent Number: 5,048,018
[45] Date of Patent: Sep. 10, 1991

[54] DEBUGGING PARALLEL PROGRAMS BY SERIALIZATION

[75] Inventors: David Bernstein, Bronx; Kimming So, Armonk, both of N.Y.

[73] Assignee: International Business Machines Corporation, Armonk, N.Y.

[21] Appl. No.: 373,953

[22] Filed: Jun. 29, 1989

[51] Int. Cl.⁵ .............................................. G06F 11/00
[52] U.S. Cl. ..................................... 371/19; 364/200; 364/267.91
[58] Field of Search ........................................ 371/19; 364/200 MS File, 900 MS FILE, 267.91, 275.5

[56] References Cited

U.S. PATENT DOCUMENTS

| | | | |
|---|---|---|---|
| 4,797,885 | 1/1989 | Orimo et al. | 371/19 |
| 4,803,683 | 2/1989 | Mori et al. | 371/19 |
| 4,905,183 | 2/1990 | Kawaguchi et al. | 364/900 |
| 4,953,084 | 8/1990 | Meloy et al. | 364/200 |

OTHER PUBLICATIONS

Appelbe et al., "Anomaly Reporting—A Tool for Debugging and Developing Parallel Numerical Algorithms", Proceedings of the First International Conference on Supercomputing Systems, 1985, pp. 386-91.
McDowell et al., "Minimizing the Complexity of Static Analysis of Parallel Programs", Proceeding of the Twentieth Hawaii International Conference on Systems Sciences, 1987, pp. 171-176.
Jason Gait, "A Debugger for Concurrent Programs", Software Practice and Experience, Jun. 1985, pp. 539-554.
Carnevali et al., "Microprocessing on IBM Multiprocessors", IBMJ, vol. 30, No. 6, Nov. 1986, pp. 474-582.
LeBlanc et al., "Debugging Parallel Programs with Instant Reply", IEEE Transaction on Computers, vol. C-36, Apr. 1987, pp. 471-480.
Kue-Chung Tai, "Reproducible Testing of Concurrent Ada Programs", SOFTWARE II. A Second Conference of Software Development Tools Techniques and Alternatives, 1985, pp. 114-121.
Ravaschio et al., "Ode Online Debugger for Emmali", A.I.C.A. Annual Conference Proceeding, 1984, pp. 401-408, vol. 2.
Chien, "AlKalm Mat Lapok(Hungary)" vol. 12, No. 3-4, 1986, pp. 329-351.

Primary Examiner—Charles E. Atkinson
Attorney, Agent, or Firm—Ratner & Prestia

[57] ABSTRACT

A serializatin debugging facility operates by assisting the computer programmer in the selection of parallel sections of the parallel program for single processor execution in order to locate errors in the program. Information is collected regarding parallel constructs in the source program. This information is used to establish program structure and to locate sections of the program in which parallel constructs are contained. Program structure and the locations of parallel constructs within a program are then displayed as a tree graph. Viewing this display, a programmer selects parallel sections for serialization. Object code for the program is then generated in accordance with the serialization instructions entered by the programmer. Once executed, the programmer can compare the results of execution of parallel sections of the program in a single processor and a multiprocessor environment. Differing execution results in each environment is indicative of a parallel programming error which can then be corrected by the programmer. The programmer can repeat these steps, each time selecting different sections of the program for serialization. In this way, erroneous sections of the program can be localized and identified.

12 Claims, 13 Drawing Sheets

| NAME | NUMBER OF CALLING SUBPROGRAMS | ARRAY OF INDICES OF CALLING SUBPROGRAMS | TYPE | NUMBER OF PARALLEL SECTIONS | ARRAY OF INDICES OF PARALLEL SECTIONS | SERIAL FLAG | DONE FLAG |
|---|---|---|---|---|---|---|---|
| 301 | 302 | 303 | 304 | 305 | 306 | 307 | 308 |

FIG.4

| LABEL | SERIAL FLAG | INDEX OF THE ENCLOSING SUBPROGRAM |
|---|---|---|
| 401 | 402 | 403 |

QUERY 2301 — SERIALIZE A SUBPROGRAM BY NAME

QUERY 2302 — UNSERIALIZE A SUBPROGRAM BY NAME

QUERY 2303 — SERIALIZE A SUBPROGRAM BY INDEX

QUERY 2304 — UNSERIALIZE A SUBPROGRAM BY INDEX

QUERY 2305 — DISPLAY THE NAME OF A SUBPROGRAM BY ITS INDEX

QUERY 2306 — SERIALIZE A PARSECT BY LABEL

QUERY 2307 — UNSERIALIZE A PARSECT BY LABEL

QUERY 2308 — SERIALIZE A PARSECT BY INDEX

QUERY 2309 — UNSERIALIZE A PARSECT BY INDEX

QUERY 2310 — DISPLAY THE LABEL OF A PARSECT BY ITS INDEX

QUERY 2311 — DISPLAY THE STATUS OF PARSECTS IN A SUBPROGRAM BY THE INDEX OF A SUBPROGRAM

QUERY 2312 — SERIALIZE ALL THE PARSECTS IN A SUBPROGRAM BY ITS INDEX

QUERY 2313 — UNSERIALIZE ALL THE PARSECTS IN A SUBPROGRAM BY ITS INDEX

QUERY 2314 — REMOVE ALL THE SERIALIZATION FROM THE PROGRAM

QUERY 2315 — EXIT

DEBUGGING PARALLEL PROGRAMS BY SERIALIZATION

Description

1. Field of Invention

This invention is in the field of computing systems, and specifically is directed to debugging computer programs. In particular, a method is set forth of the debugging of parallel programs by selective serialization.

2. Background of the Invention

Shared memory multiprocessors provide an inexpensive and efficient way to achieve potentially high computational power. To take advantage of this computational power, the source program has to be written in a parallel language (or in an extension of a sequential language for multiprocessors). Recently, many parallel extensions to sequential languages,. like Fortran and C, have been designed and implemented to support the development of parallel programs on shared memory multiprocessors.

One major problem in the development of programs in general, and parallel programs in particular, is finding and correcting errors in the program, a step known as debugging. While techniques for debugging sequential programs are well known, these techniques are not easily applicable to parallel programs. Of the several general schemes for debugging programs, namely breakpoints and event tracing, none are readily applicable to parallel programs.

Parallel programs are harder to debug then serial programs for several reasons. First, it is difficult to control the executing processes and to display the information at breakpoints in which these processes are stopped. Second, the overhead of printing execution traces or status information may change the order or parallel execution, hide errors, or even introduce new errors. Third, conventional debugging tools display a large amount of information during the execution of a program. The volume of output data which is displayed to debug a parallel system is even greater than that which would be needed to debug a sequential system.

Furthermore, errors often appear only after the "defective" program statement has been executed. Without additional knowledge of how parallel work in a user program is distributed across multiple processors in a parallel system, the debugging of a parallel system may be an order of magnitude more difficult than its sequential counterpart.

In the present invention, a method is set forth which leads to a parallel debugging facility running within a preprocessor or a parallelizing compiler of a parallel language. This method helps the user to locate bugs in a parallel program without requiring lengthy tracing or breakpoint setting, thus avoiding the problems mentioned above.

The method of the invention is based on the following observations on parallel programming:

1. Most of the available parallel programming languages are conventional sequential languages augmented by a small set of parallel constructs which allow a user to specify parallel work and synchronization. In these languages the parallel constructs can be identified and labelled wherever they are used in a user program.

2. Usually, a parallel program is organized so that computation is separated into serial and parallel sections. A parallel section is a program segment executable by a number of processes. Parallel DO loops and fork constructs are the most common parallel sections.

3. Many parallelized programs can still be executed serially by one process in a parallel system. The results of executing a parallel program sequentially and in parallel are either identical or sufficiently close as to be effectively identical.

Since a serial section can be viewed as a parallel section which can only be executed by one processor, it is possible to change any parallel section in a program to a be serial section and still obtain comparable results. If program errors occur in parallel execution, resulting in the generation of incorrect results, one can use the results from the serial execution of a program to calibrate the corresponding parallel execution.

The method of this invention allows the user to selectively serialize parallel sections of the program to locate the errors. When a problematic section of code is identified, an error can be located through code inspection or other conventional techniques (i.e., breakpoints and event tracing).

SUMMARY OF THE INVENTION

The present invention operates by assisting the computer programmer in the selection of parallel sections of code for compiler serialization, and ultimately single processor execution. Once executed, the programmer can prepare the results of excution of parallel sections of code in a single processor and a multiprocessor environment. Differing execution results in each environment is indicative of a parallel programming error which can then be corrected by the programmer.

Operation of the present invention occurs in a series of steps as follows. First, information is collected regarding parallel constructs in the source code. This information is used to establish program structure and to locate sections of code in which parallel constructs are contained. Program structure and the locations of parallel constructs within a program are then displayed. Viewing this display, a programmer selects parallel constructs for serialization. Finally, object code for the program is generated in accordance with the serialization instructions entered by the programmer.

DETAILED DESCRIPTION

The following are definitions of terms that are used in the description of the invention that follows.

PARALLEL PROGRAM—A program which contains pieces of work to be executed by multiple processes; it has been coded to specify serial or parallel execution in individual sections.

PROCESS—A logical execution stream participating in the parallel execution of a parallel program.

Processes which execut cooperatively in parallel sections usually divide the work among themselves. Generally, it is possible to execute a parallel program by using only one process, thus effectively executing the program sequentially. In simplified form, executing processes may be considered to have a one-to-one correspondence with processors (or CPUs) in the multiprocessor system.

SERIAL SECTION—A segment of a parallel program that is coded to be executed by only one process. While it is being executed other processes may be idle or executing different pieces of work.

PARALLEL SECTION (or PARSECT)—A segment of a parallel program that is coded to be executed by more than one process simultaneously (e.g., in parallel DO loops different processes may work on respectively different iterations of the DO loop).

SERIALIZATION OF PARALLEL SECTIONS—A technique which allows a preprocessors/compiler of a parallel language to convert a section of a parallel program that was specified for parallel execution (parallel section) into a format which is suitable for serial execution.

SUBPROGRAM—A program unit of a program (e.g., subroutines, functions, main, etc.).

CALLING GRAPH—A graph in which there is a node for each subprogram is a program. Within a calling graph there is a directed edge from node A to node B if and only if subprogram B is invoked from within the body of the subprogram A.

COMPUTATIONAL MODEL—The way a user conceives of the processing of a parallel program within a parallel programming system.

PREPROCESSOR—A software tool that is able to translate a parallel program into a program written in a sequential language with the setup for parallel execution.

PARALLEL CONSTRUCT—A construct of a parallel language that carries certain information regarding the parallel execution of a program (e.g., the beginning and the end of a parallel section, or the beginning and the end of a serial section). Generally, parallel constructs are irrelevant for the sequential execution of a program.

A debugging session of a parallel program in accordance with the present invention includes the following steps:

1. A program with parallel constructs is compiled and executed on one processor so that the entire program is serialized. The program is debugged using conventional techniques until correct results are obtained.

2. The program is recompiled and executed on the desired number of processors. Incorrect results are obtained.

3. Based on the differences between the correct and incorrect results, parallel sections of code to be serialized are specified. A method for determining which sections of code should be serialized is discussed below.

4. The program is recompiled and executed on the desired number of processors. However, the portions of code which have been specified in step #3 are serialized. 5. Step $\pi 3$ and step #4 are repeated until the program errors have been narrowed down to specific sections of serialized code.

6. Attention is returned to the original source code of the identified sections. This code is searched for errors in these sections.

The sequence of steps 3 through 6 is referred to as a cycle and can be repeated as many times is needed in order to locate one or more program errors.

Figure 1:
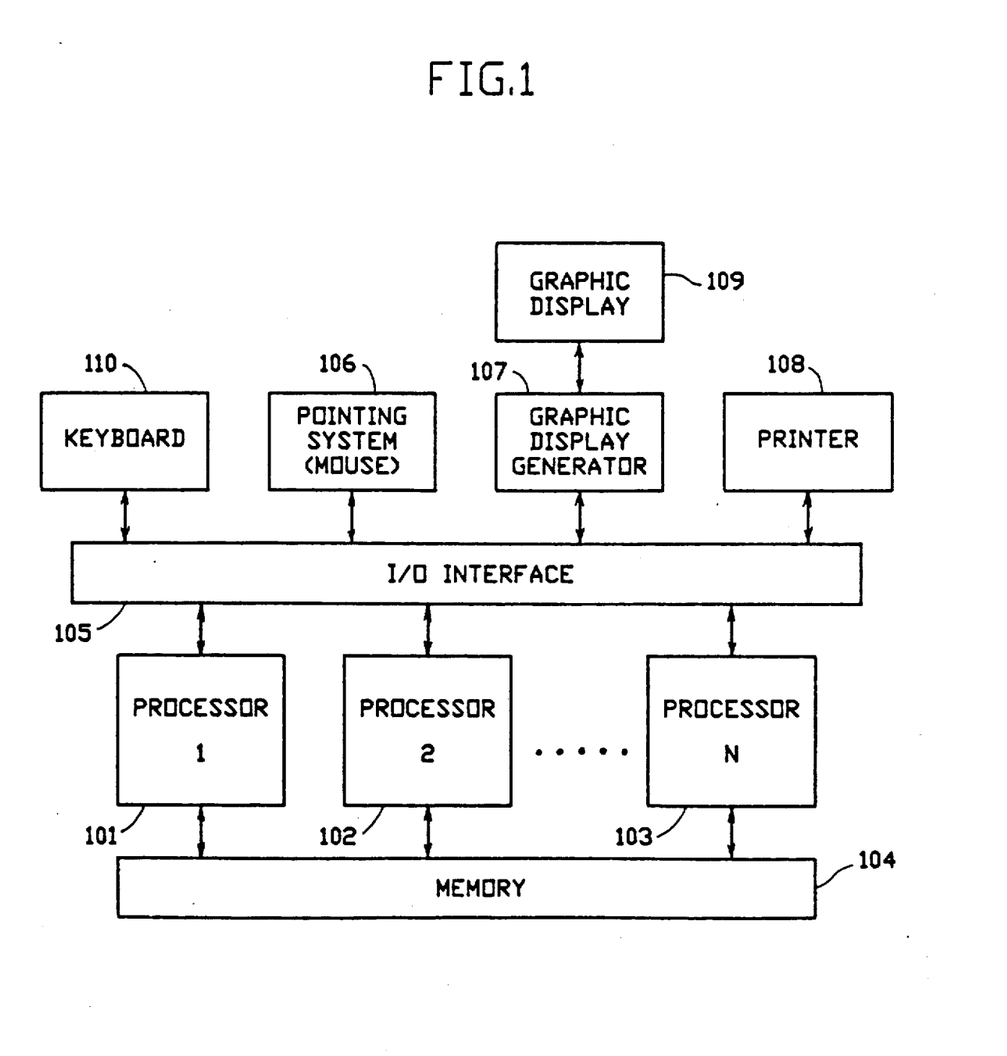
FIG. 1 is a block diagram of a computer system which may support a debugging system in accordance with the present invention.

FIG. 1 is a block diagram of a typical multiprocessor computer system. A group of N processors 101, 102 and 103 are able to execute different sections of a parallel program simultaneously. Each processor has access to a shared memory system 104 and a shared I/O bus 105 which is used by the processors for communicating with peripheral devices. Information is displayed to the user via a Graphic Display 109 which is driven by a Graphic Display Generator 107. Data is also made available through a printer 108. A pointing system (such as a mouse) 106 allows the user to interact with the computer system via the Graphic Display 109. The user is also able to interact with the computer system via a keyboard 110.

Figures 2A, 2B:
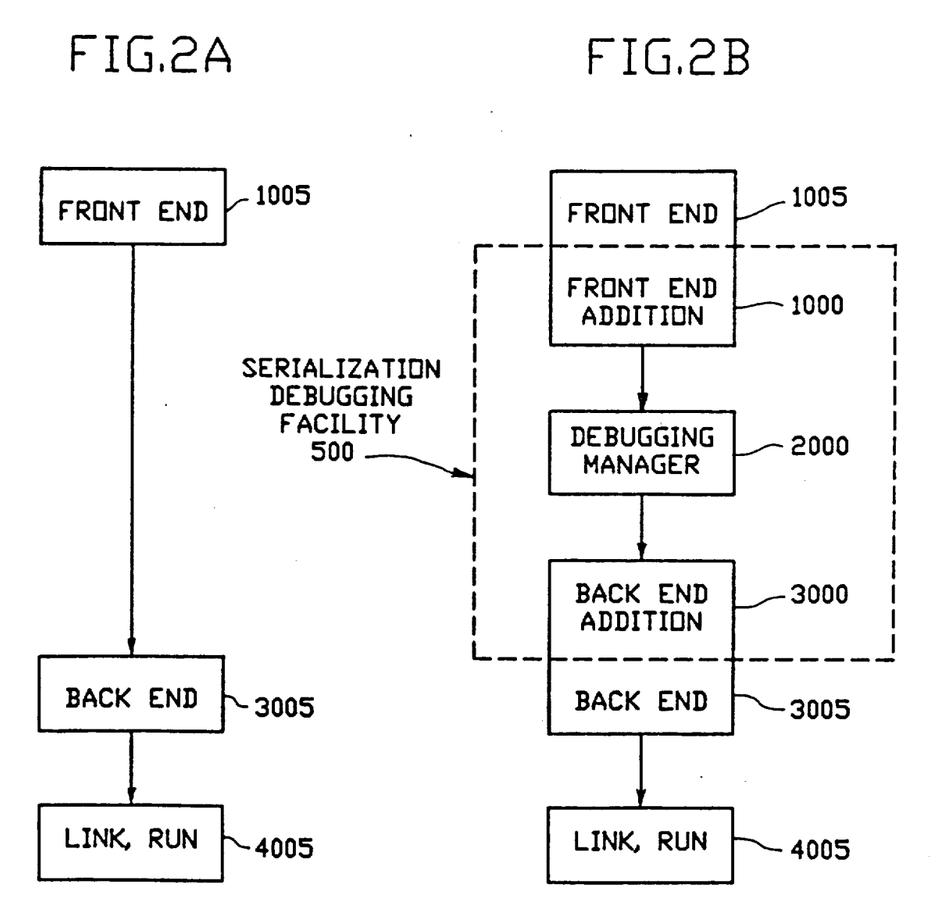
FIG. 2A is a flow chart diagram which illustrates the structure of a parallel programming systems as defined by the prior art.
FIG. 2B is a flow chart diagram which illustrates the structure of a parallel programming system that includes an embodiment of the present invention.

The general structure of a conventional parallel programming system appears in FIG. 2A. This structure contains a Front End 1005 and a Back End 3005. In the Front End, a program is scanned and information such as variable names and statement types is collected. Typical Front End 1005 activity includes lexical analysis and parsing. The Back End 3005 uses this information to generate object code.

FIG. 2B illustrates the configuration of a conventional parallel programming system which includes a serialization debugging facility. The serialization debugging facility appears within the broken line rectangle 500. FIG. 2B differs from FIG. 2A in that several additional steps occur between typical front end and typical back end processing.

The overall function of the debugging system is to collect additional information about a program in order to accept the serialization of particular sections of parallel code specified by the programmer. To accomplish this function the debugging facililty is separated into three sections: The first section is an addition 1000 to the Front End section 1005 of the conventional parallel programming system, the second section is a debugging manager 2000, and the third section is an addition 3000 to the Back End section 3005 of the conventional parallel programming system.

In the front end of the preprocessor 1005 and 1000, a first pass on the parallel program source code collects and organizes information regarding the program. Some of this information is placed into data structures which are used, as set forth below, to generate the calling graph for the program and to establish connections between subprograms and parallel sections contained in these subprograms. The debugging manager 2000 handles all interaction with the user, displaying the calling graph and allowing the user to specify the selective serialization information. Finally, the back end 3000 and 3005 generates object code for a partially or completely sequential version of the parallel program, depending upon the serialization information.

In the front end addition 1000 to the a parallel programming system, the debugging facility reads the input program and collects the information which is required to generate a calling graph. This front end addition places information into two data structures: a subprogram table and a parallel section (parsect) table.

Figure 12:
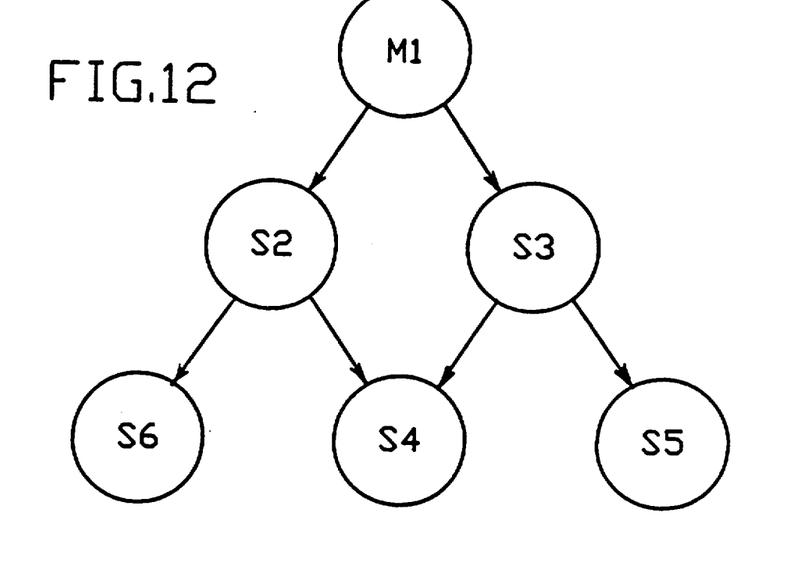
FIG. 12 is an example of a calling graph.

Essentially, the subprogram table contains the information which is needed to construct the calling graph of the program (an example of a calling graph is shown in FIG. 12) This calling graph will serve as a basis for displaying and manipulating serialization information. The structure of a record in the subprogram table is presented in FIG. 3. Each record of this table holds data for a particular subprogram. Field 301 holds the name of the subprogram (which is the name of the subroutine, function or main). The number of subprograms that invoke or call this particular subprogram are held in field 302 of the record. Field 303 holds a pointer to an array of subprogram table indices for the subprograms that invoke or call this particular subprogram. It is preferred to keep the indices of calling subprograms rather than the names of the calling subprograms in the subprogram table for quicker search and simpler bookkeeping.

Figure 3:
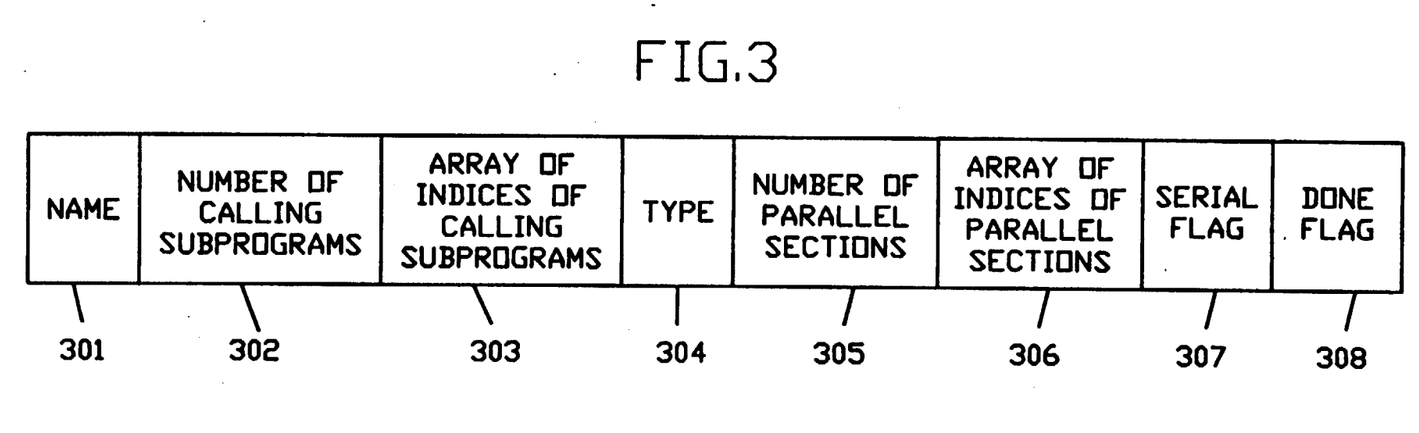
FIG. 3 is a data stucture diagram which illustrates the format of a record within a subprogram table used in the parallel programming system shown in FIG. 2.

The above information is sufficient to construct a calling graph for a program. In addition there is a field 305 which holds the number of parallel sections of code in a subprogram and a field 306 which holds a pointer to an array of indices to parsects in the parsect table. The type field (field 304) is used to identify the subprograms that may potentially lead to execution of parsects (i.e., subprograms that contain parsects, or may invoke other subprograms that contain parsects). The serial flag (field 307) is used top indicate that the user has requested the serialization of the entire subprogram. The done flag (field 308) is used to keep track of sections of a program which have been searched for parallel sections of code. This flag is used in conjuction with the algorithm described below in reference to FIG. 10.

Figure 4:
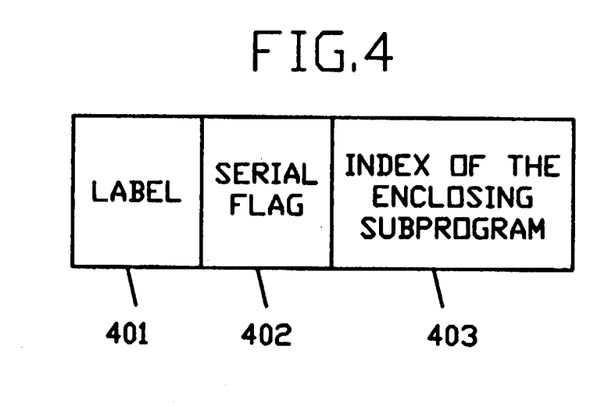
FIG. 4 is a data structure diagram which illustrates the format of a record within a table of parallel sections used in the parallel programming system shown in FIG. 2.

The structure of a record in the parsect table is presented in FIG. 4. The label field (field 401) holds a label which identifies the parsect (similar to the name of the subprogram in the subprogram table). This label is generated as a function of the parsect location within source code address space. The serial flag (field 402) is used to indicate that the user has requested the serialization of the current parsect. An index to the subprogram table is also maintained. This index (field 403) references the subprogram in which the current parsect resides.

Figure 5:
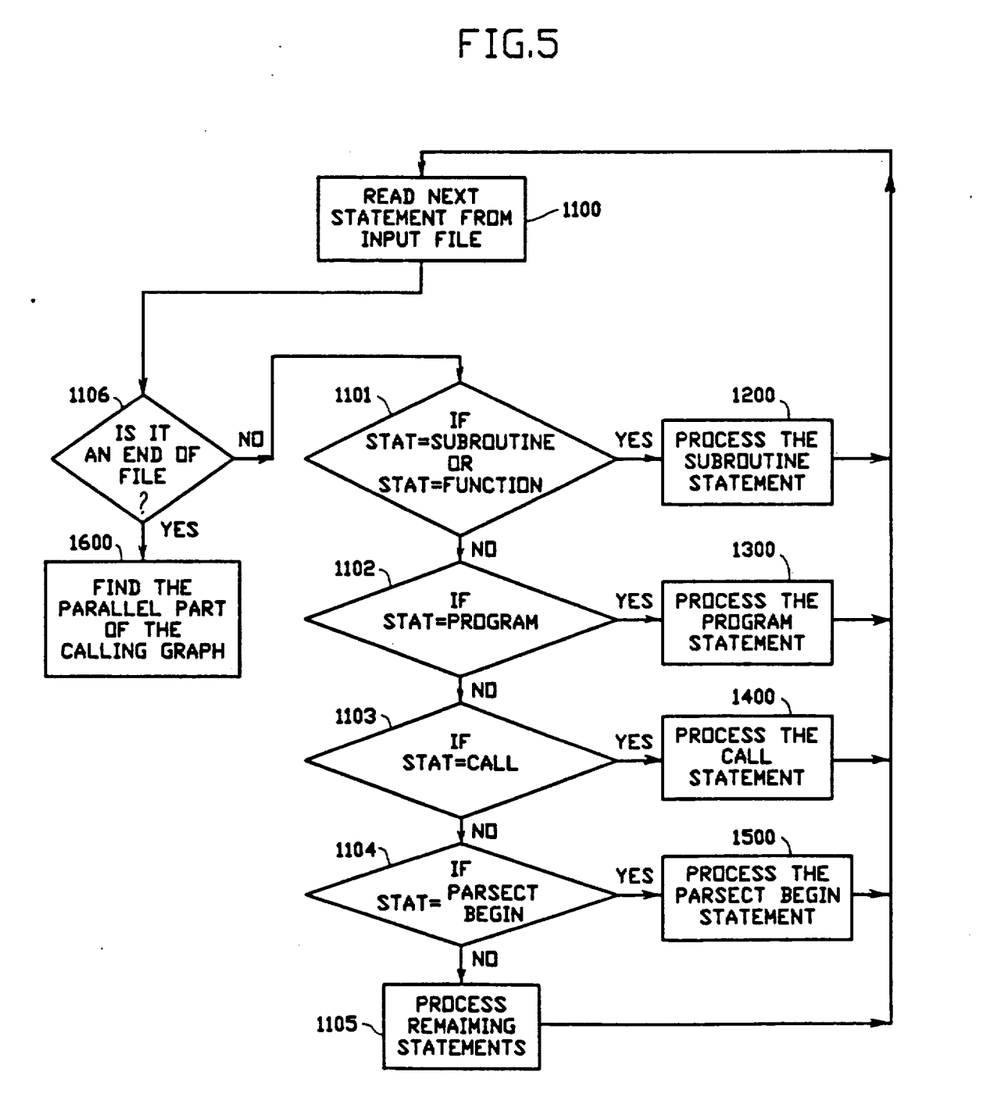
FIG. 5 is a flow chart diagram which describes the processing within the front end section of the parallel programming system, shown generally in FIG. 2.

The general structure of the front end (step 1000 of FIG. 1) is presented in FIG. 5. In the front end, the program statements from the input file are read on a line by line basis (step 1100). The detection of an "end of file" indicates that the entire program has been read (step 1106). When the entire program has been read, the algorithm for finding the parallel part of the calling graph (step 1600) begins execution. this algorithm is described below in reference to FIG. 10.

If the statement at step 1106 is not the end of file, it is identified by type and a respective action is taken. To support the serialization debugging facility, the following statement types are parsed in the front end:
statements that start a subprogram, like the SUBROUTINE or FUNCTION statements (step 1101);
statements that start a program, such as the PROGRAM statement (step 1102);
statements that call subroutines or that invoke function statements (step 1103);
statements that include parallel constructs belonging to a parsect (step 1104).

During parsing in the front end, an index representing the current subprogram or main program is maintained. This index references the currently traversed program element within the subprogram table.

Figure 6:
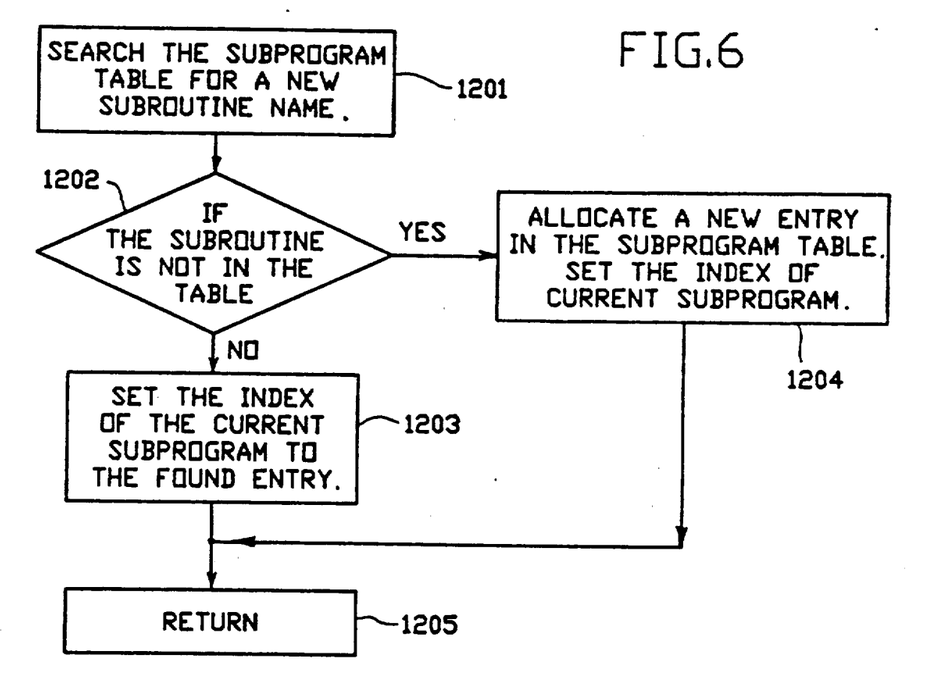
FIG. 6 is a flow chart diagram which illustrates the processing of SUBROUTINE and FUNCTION statements, shown generally in FIG. 5.

The SUBROUTINE and FUNCTION statements are processed as shown in FIG. 6. First (step 1201) the subprogram table is searched for the name of the subprogram. If the name of the subprogram is found (step 1202), then the index of the current subprogram is set to the found entry (step 1203). Otherwise (step 1204) a new entry is allocated in the subprogram table and the index of the current subprogram is set. An entry may be allocated in the subprogram table for a certain subprogram even before the preprocessor encounters the respective SUBROUTINE or FUNCTION statement. This results from a CALL statement to that subprogram or an invocation of the function occurring in another subroutine or in the main program.

Figure 7:
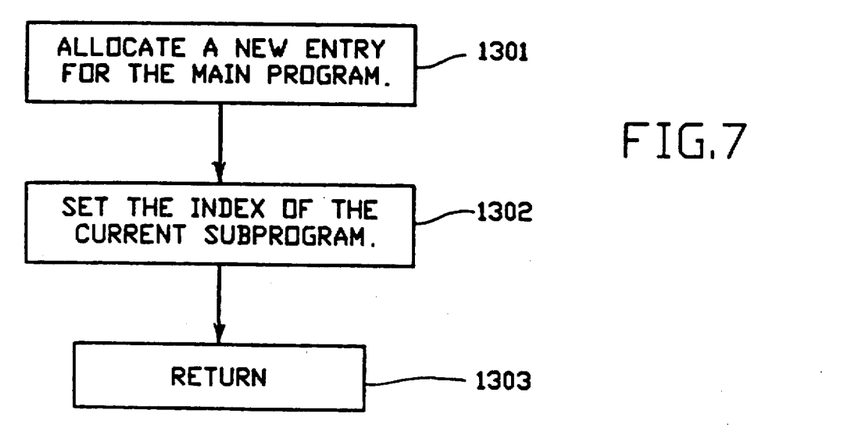
FIG. 7 is a flow chart diagram which illustrates the processing of PROGRAM statements, shown generally in FIG. 5.

The PROGRAM statement is similarly processed (see FIG. 7). Since the PROGRAM statement appears only once it always generates a new entry in the subprogram table (step 1301). After this allocation occurs, the index of the current subprogram (step 1302) is set.

Figure 8:
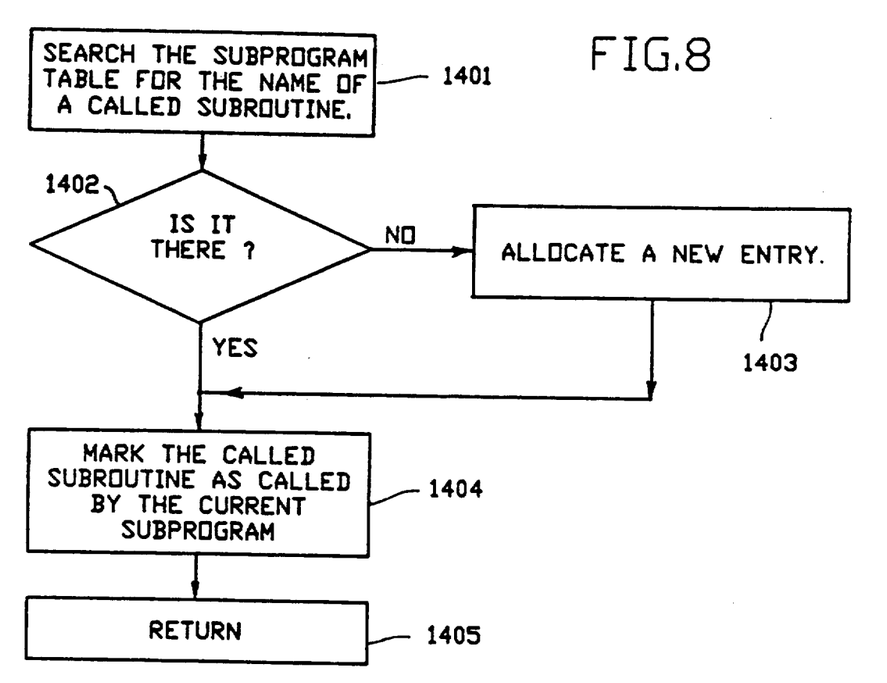
FIG. 8 is a flow chart diagram which illustrates the processing of CALL statements, shown generally in FIG. 5.

The CALL statement (or a function call imbedded in another statement) is processed as shown in FIG. 8. First, the subprogram table is searched for the name of the subprogram (i.e. subroutine or function) that is invoked (step 1401). If the subprogram is not found (step 1402), then a new entry is allocated for the subprogram in the subprogram table (step 1403). Once the subprogram has been found or created in the subprogram table, the subprogram is marked as being called by the subprogram (step 1404).

Figure 9:
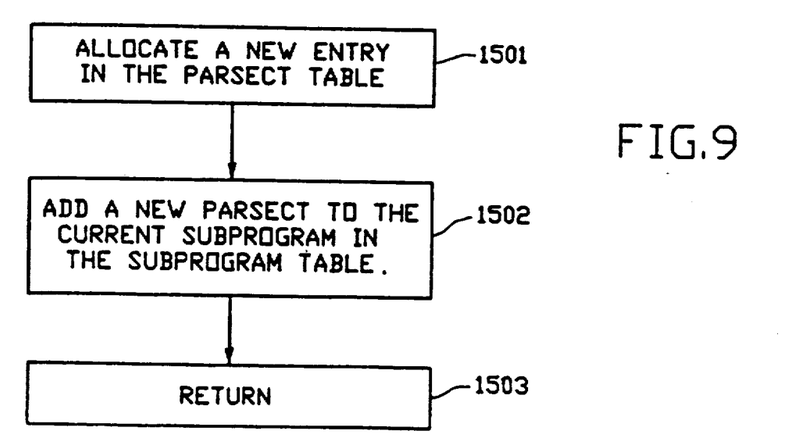
FIG. 9 is a flow chart diagram which illustrates the processing of PARSECT BEGIN statements, shown generally in FIG. 5.

When the beginning of a new parsect is encountered, it is processed as shown in FIG. 9. First, the parsect is allocated an identifier and a new entry in the parsect table (step 1501). The parsect label may be printed in a listing of the source code produced by the parallel programming system shown in FIG. 2B. The index of the enclosing subprogram of the parsect (field 403 in the parsect table record, see FIG. 3) is set to the index of the current subprogram. Then, a new parsect is added to the current subprogram (step 1502).

When the entire input file has been processed, the subprogram table has sufficient information to construct the calling graph of the program. However, there are parts of the program that never lead to execution of parsects, and therefore, are of no interest to the debugging facility. Therefore, the nodes of the graph that correspond to these parts of the program are not shown to the user. These nodes of the calling graph are identified by traversing the graph and setting the type field of each node as appropriate.

Figure 10:
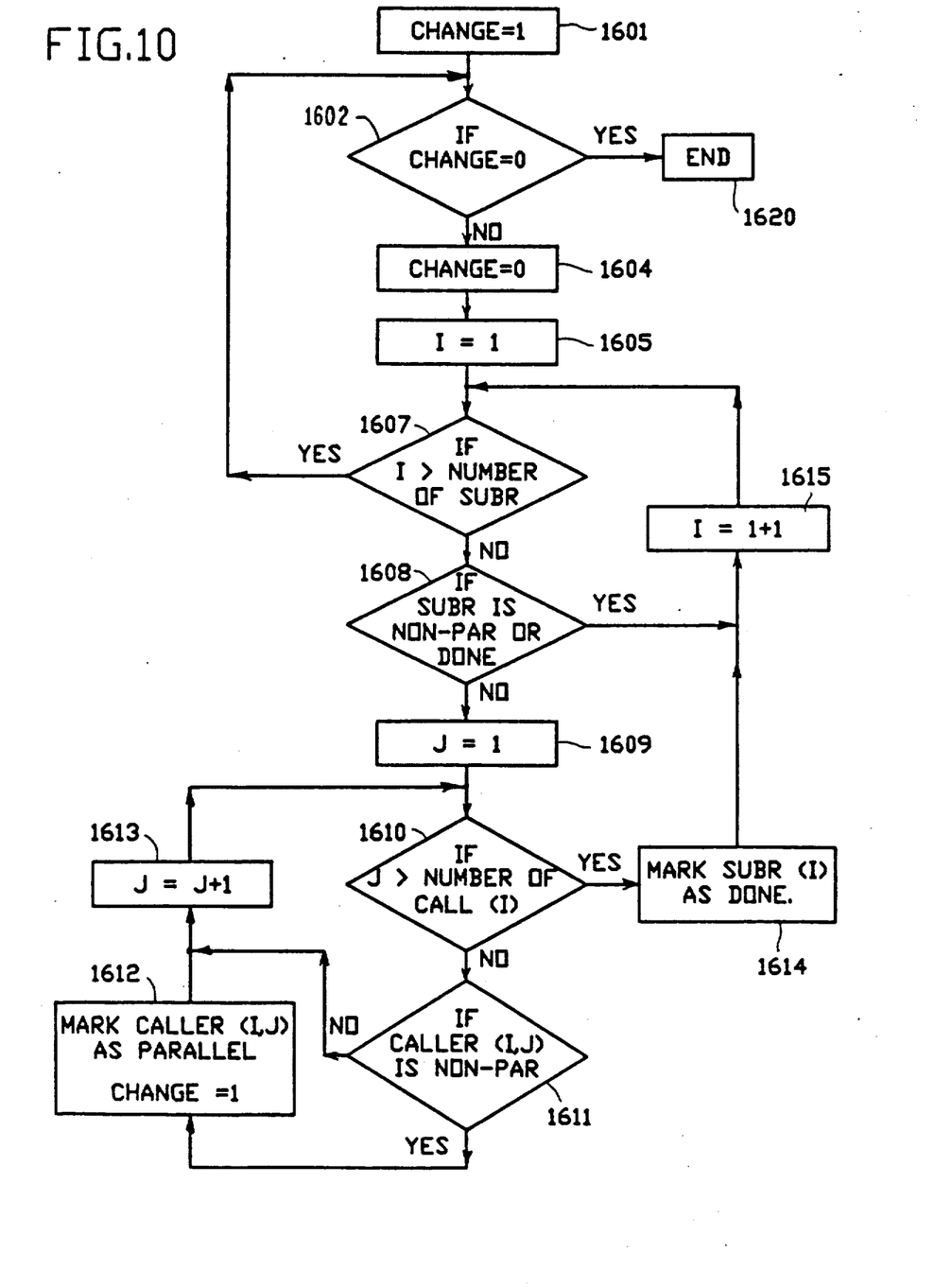
FIG. 10 is a flow chart diagram which illustrates the generation of a calling graph.

FIG. 10 is a diagram of the algorithm which finds the parts of the program that may lead to execution of a parsect. The described algorithm respresents the preferred method of traversing the calling graph to accomplish this function.

The algorithm shown in FIG. 10 uses three variables to control its execution: CHANGE, I and J. The variable CHANGE controls the number of times the complete algorithm must be performed on a calling graph. The algorithm is performed for each level of subprogram nesting within a main program. The variable I is used to reference each subroutine in the program and the variable J is used to reference each subprogram that calls subroutine I.

The algorithm initializes CHANGE to 1 (step 1601). If, at step 1602, CHANGE has a value of zero, step 1620 is executed which ends the traversing of the calling graph. Otherwise step 1604 is executed to set the variable change to 0. If, at a later point in the algorithm, change is set to 1 again (i.e. at step 1612) then the algorithm is executed again (step 1602) to insure that all levels of the calling graph have been processed.

I is initialized to 1 at step 1605. The algorithm then goes through each subprogram (steps 1607, 1608 with succeeding analysis of calling subprograms, and 1615). Serial subprograms are ignored (step 1608). If all subroutines have been analyzed (step 1607) then control shifts to step 1602 from which the algorithm may terminate (step 1620) if all processing has been completed, or may be executed agains if CHANGE has been set to 1.

Subroutines which have parallel sections of code and which have not been completely processed and, so, may be invoked by otherwise serial subprograms, are further analyzed in steps 1609-1614. The index to each subprogram that calls the subroutine under analysis is initially set to 1 (step 1609) and is incremented by 1 for each subprogram (step 1613) until all of the calling subprograms have been processed (step 1610) at which point the subroutine or function is marked as "done" (step 1614) and the next subroutine or function is analyzed (step 1608 via steps 1615 and 1607). When a subroutine or function which includes parallel constructs is encountered, the calling subprogram is marked as being parallel and the variable CHANGE is set to 1 (step 1612). In this way, the indication of parallelism is carried upward to the highest level of calling subprogram within the calling graph.

Figure 11:
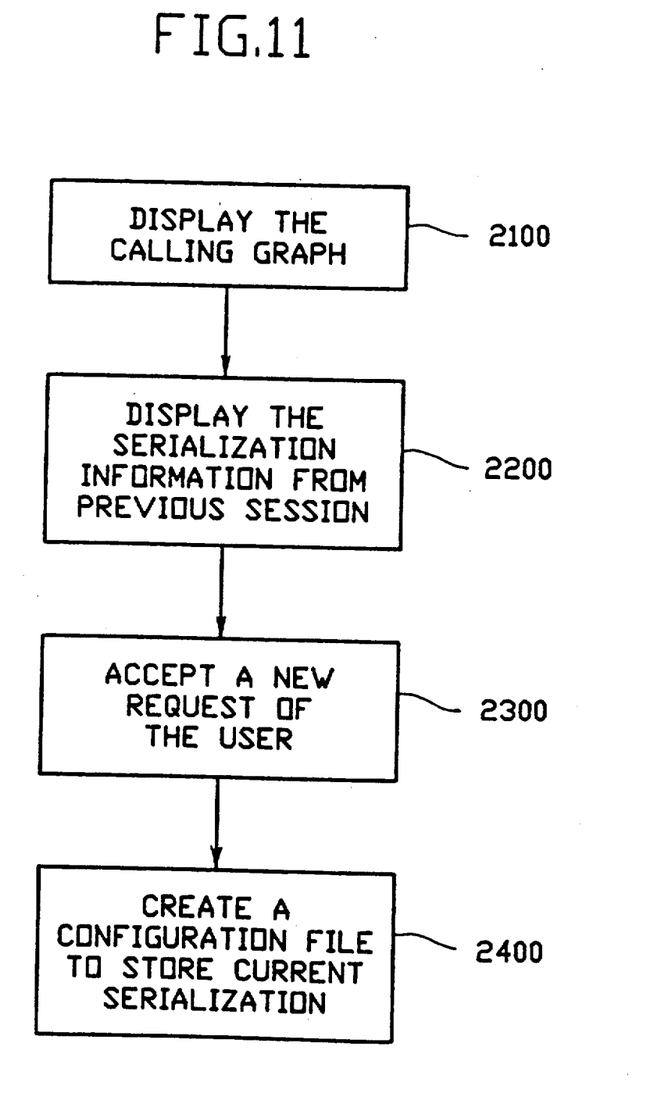
FIG. 11 is a flow chart diagram of processing within the debugging manager, shown generally in FIG. 2.

A flow chart diagram of the debugging manager is presented in FIG. 11. As a first step, 2100, the calling graph is displayed. An example of a calling graph is shown in FIG. 12. While there are numerous ways to display information that is relevant to the calling graph, a preferred implementation will be described.

In the preferred implementation of the hardware (FIG. 1), the calling graph appears on the graphic display 109 by the use of a graphic display software system, such as X-Windows (available through free license from Massachusetts Institute of Technology). Graphic display software can control the graphic display generator 107 which creates the images on the graphic display 109. The graphic display software, the user code and the programming associated with the present invention can all run on the computer system shown in FIG. 1.

Subprograms are represented as nodes of the graph. Nodes that represent subprograms containing parsect code are called parallel nodes. There is an upward edge from node X to node Y in the graph, if subprogram X is called by subprogram Y at least once. The indices of entries in the subprogram table for corresponding subprograms appear on the nodes of the calling graph.

By using a pointing device such as, for example, the mouse system 106, shown in FIG. 1, names of subprograms and references to parsect code can temporarily be displayed. This may be done, for example, by clicking the mouse when a pointer graphic associated with the mouse is over a specific node. Because the programmer is only concerned with parsect code, only parallel nodes of the calling graph are displayed. In addition to this graphic display, listings of subprogram table indices, with corresponding subprogram names, labels and parsect reference data are provided by the parallel programming system through the printer 105.

Figure 13:
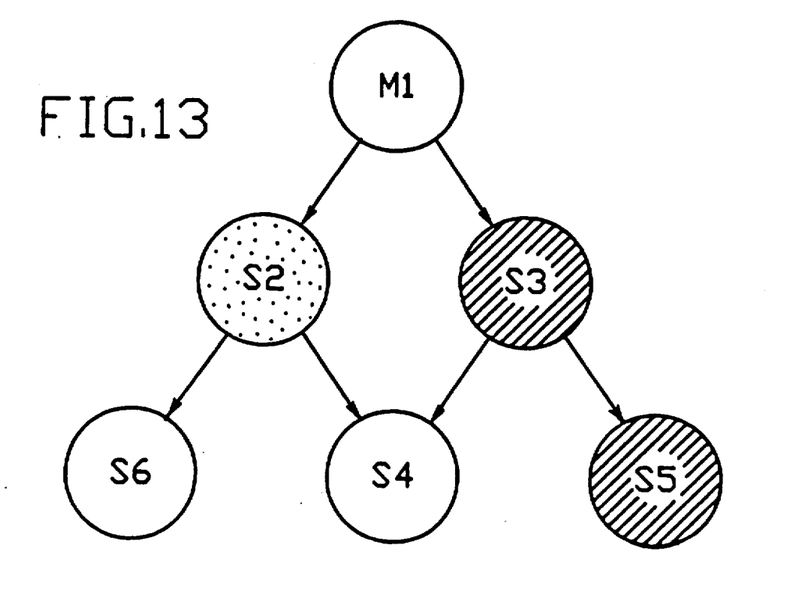
FIG. 13 is an example of how serilization information may be displayed on a calling graph.

The next function (step 2200 of FIG. 11) of the debugging manager is to display the serialized parts of the graph as shown in FIG. 13. Initially, when the debugging session begins, no parts of the graph are serialized. Therefore, compared to what appeared in FIG. 12, nothing should be updated on the calling graph. As the user starts to issue serialization queries (step 2300 of FIG. 11), the serialization information is promptly displayed on the graph.

In FIG. 13, indications of the requested amount of subprogram serialization are displayed. In a preferred implementation of the invention two different shades are used. One shade is used when the user has requested serialization of the entire subprogram (e.g. subprogram with index 2 in FIG. 13). Another shade is used when only one or more parsects in a subprogram are serialized (e.g. subprograms with indices 3 and 5 in FIG. 13). After the user specifies serialization information and continues the debugging session by compiling and running his program, serialization information is saved in special file (step 2400 of FIG. 11) and can be available for display at the beginning of future debugging sessions.

Figure 14:
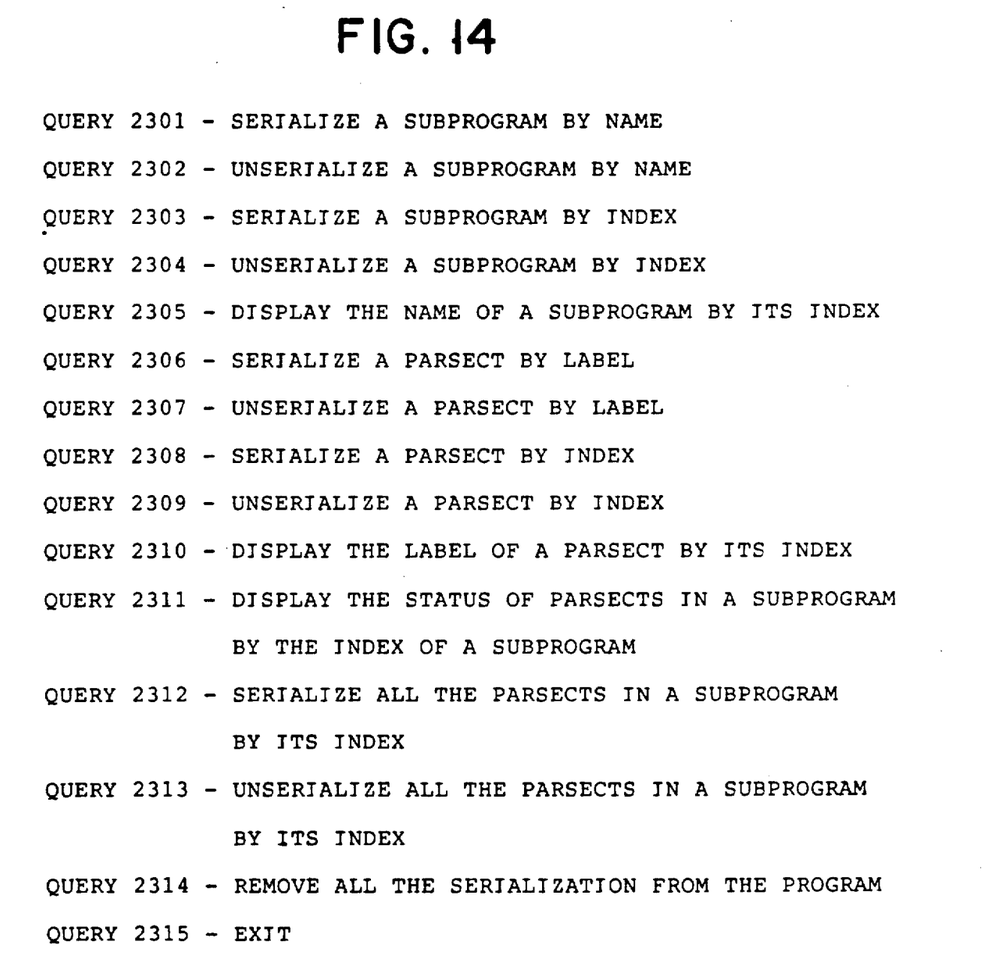
FIG. 14 is a list of queries from the debugging manager, shown generally in FIG. 11.

Once the calling graph with the serialization information from the previous cycle of the debugging session is displayed, the user can examine the information and can change it, i.e., add serialization to or remove it from the program. This is performed by using queries in the debugging manager (step 2300 of FIG. 11). A mouse-type menu structure can be used to invoke the various queries. In the alternative, a set of mnemonics representing the queries may be made available to the user as shown in FIG. 14 and the user may invoke the queries by typing the mnemonics on the keyboard. The description of the queries is as follows:

QUERY 2301: Serialize a subprogram by name. This query provides a way to mark all parallel constructs in a subprogram as serial. This is reflected by setting the serial flag in the subprogram table for the corresponding entry (this entry is found by searching the subprogram table using the name as a key).

QUERY 2302: Unserialize a subprogram by name. This query provides the way to remove the serialization that was set by using QUERY 2301 and set all parallel constructs in the subprogram to be parallel.

QUERY 2303: Serialize a subprogram by index. This query provides a way to mark the whole subprogram as serial. This is reflected by setting the serial flag in the subprogram table for the index which was supplied in the query.

QUERY 2304: Unserialize a subprogram by index. This query provides the way to remove the serialization that was set previously for the index to the subprogram table which was supplied in the query.

QUERY 2305: Display the name of a subprogram whose index in the subprogram table is supplied. This query provides a way to establish a relationship between the indices of the subprograms that are displayed and the names that appear in the source code of the program.

QUERY 2306: Serialize a parsect by label. This query provides a way to serialize the parsect whose label is supplied in the query. In this embodiment of the invention, the parsect label is provided by the parallel programming system as a part of a source program listing. A parsect is serialized by setting the serial flag in the parsect table for the corresponding entry (this entry is found by searching the parsect table using the label as a key).

QUERY 2307: Unserialize a parsect by label. This query provides a way to remove the serialization of the parsect whose label is supplied in the query. This query is similar to QUERY 2306, however, it clears the serial flag of the found entry.

QUERY 2308: Serialize a parsect by index. This query provides a way to remove the serialization of the parsect whose index in the parsect table is supplied in the query.

QUERY 2309: Unserialize a parsect by index. This query provides a way to remove the serialization of the parsect whose index in the parsect table is supplied in the query.

QUERY 2310: Display the label of a parsect whose index in the parsect table is supplied. This query provides a way to establish a relationship between the indices of parsects in the parsect table that might be displayed and the labels of the corresponding parsects that appear in the source code of the program.

QUERY 2311: Display the status of all the parsects contained in a subprogram whose index is supplied in the query (label of a parsect, serial or parallel).

QUERY 2312: Serialize all the parsects in a subprogram whose index is supplied in the query. This query provides a convenient way to serialize all the parsects in a subprogram without going through them one by one.

QUERY 2313: Unserialize all the parsects in a subprogram whose index is supplied in the query. This query provides a convenient way to remove the serialization of all the parsects in a subprogram without going through them one by one.

QUERY 2314: Remove all the serialization from the program.

QUERY 2315: EXIT terminates the communication between the user and the debugging manager. The flow of the debugging session proceeds to step 2400 of FIG. 11.

Figure 15:
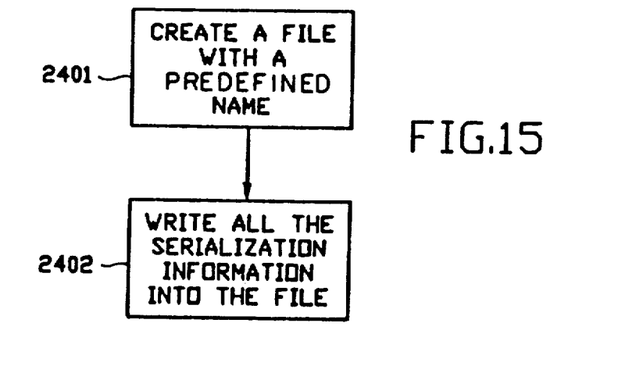
FIG. 15 is a flow chart diagram which illustrates the creation of a configuration file.

After all user requests have been entered (step 2300 of FIG. 11), a file of serialization data is stored for future use (step 2400 of FIG. 11—refer to FIG. 15).

The serialization debugging facility 500 works with the back end 3005 in FIG. 2B of a conventional parallel programming system by directing compiler serialization of user specified parsect code. A flow chart diagram which illustrates the back end processing is shown in FIG. 16.

Figure 16:
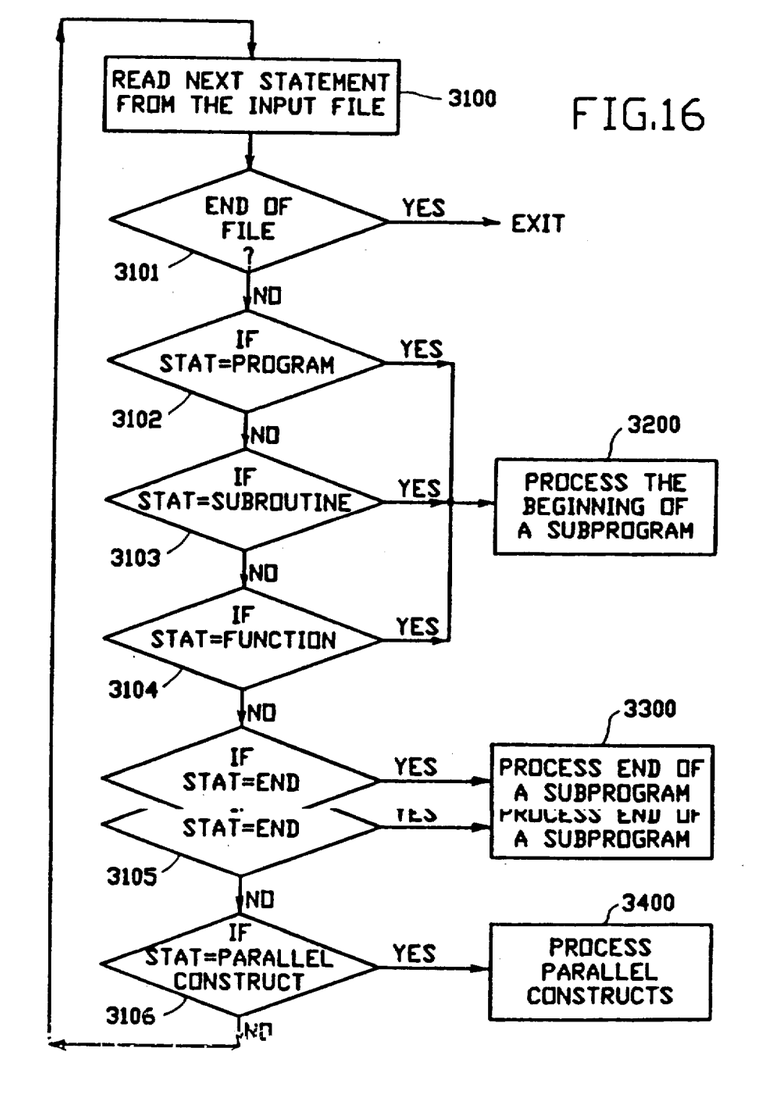
FIG. 16 is a flow chart diagram which illustrates back end processing of the parallel programming system, shown generally in FIG. 2.

The back end operates by reading the input program a second time on a statement by statement basis (step 3100 of FIG. 16). If an "end of file" is found (step 3101 of FIG. 16), code generation is terminated.

Figure 17:
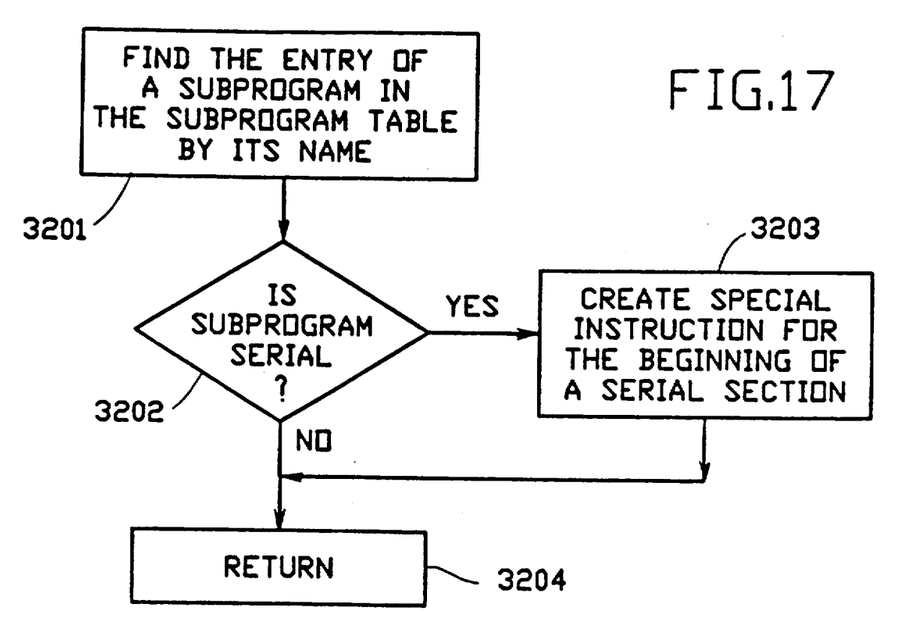
FIG. 17 is a flow chart diagram which illustrates subprogram initiation in the back end processing, illustrated in FIG. 16.

If one of the keywords PROGRAM, SUBROUTINE or FUNCTION are recognized (boxes 3102, 3103 and 3104, respectively, of FIG. 16), the statement is processed as the beginning of a subprogram (step 3200 of FIG. 16). In each case, the subprogram table is searched by the name of the processed subprogram until the index of this program is found (step 3201 of FIG. 17) and the serial flag of the entry is examined (step 3202 of FIG. 17). If the serial flag is on, a special instruction is emitted by the compiler that establishes the beginning of a serial section (step 3203 of FIG. 17). This restricts the parsect code to be executed by only one process. This is the same instruction that is emitted by the front end of a conventional parallel programming system when a user explicitly requests the serialization of a certain section of the program. For example, in a system where parallel execution is the default and serial sections are explicitly defined, a section of code may appear as follows:

10 CODE
20 SERIAL BEGIN
30 CODE
40 SERIAL END
50 CODE

In this example, statements 20 and 40 explicitly define a serial section of code. For this system, the instructions emitted at step 3203 are identical to those shown in lines 20 and 40 of the above example.

However, in some computer systems, the default is to generate serial code and parallel sections are explicitly defined. For example:

10 CODE
20 PARALLEL END
30 CODE
40 PARALLEL BEGIN
50 CODE

In this example, statements 20 and 40 implicitly define a serial section of code. The instructions emitted at step 3203, while not identical to the code generated in lines 20 and 40 of the above example cause the same effect on compiler serialization. Care should be taken in a system of this type to ensure that each parallel end is preceded by a parallel begin and that each parallel begin is followed by a parallel end.

Figure 18:
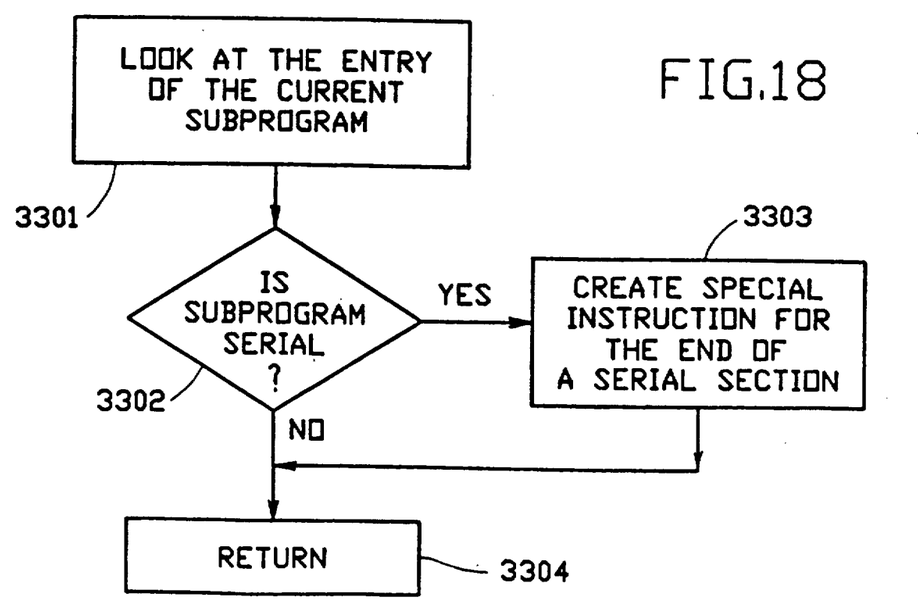
FIG. 18 is a flow chart diagram which illustrates subprogram termination in the back end processing, shown in FIG. 16.

If an END statement is found (step 3105 of FIG. 16), the end of a subprogram is processed (step 3300 of FIG. 16). First, the entry of the subprogram table that corresponds to the index of the current subprogram is examined (step 3301 of FIG. 18). If the current subprogram is serial (step 3302 of FIG. 18), a special instruction is created for the end of a serial section (step 3303 of FIG. 18). If the current subprogram is not serial, then nothing is done.

Figure 19:
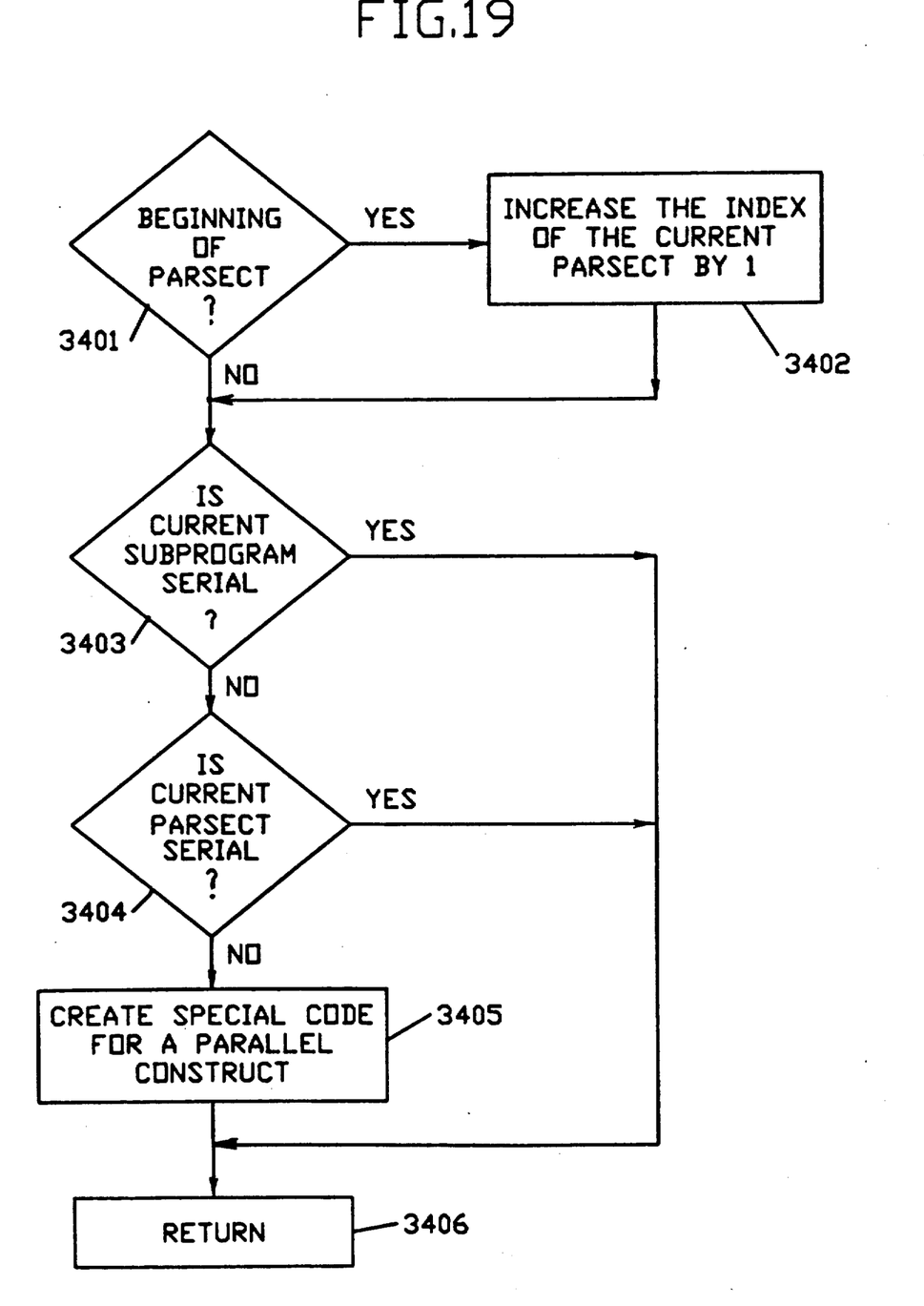
FIG. 19 is a flow chart diagram which illustrates the processing of parallel constructs in the back end section of the parallel programming system, shown generally in FIG. 16.

If parallel constructs are found (step 3106 of FIG. 16), these parallel constructs are processed (step 3400 of FIG. 16). First, an examination is made to determine if the parallel construct is for the beginning of a parsect (step 3401 of FIG. 19). If it is, then the index of the current parsect is increased by 1 (step 3402 of FIG. 19). If the current subprograms or the current parsect have been serialized (step 3403 and 3404 of FIG. 19), then nothing is done. If the current subprogram or the current parsect have not been serialized (step 3403 and 3404 of FIG. 19) then a special instruction for a parallel construct is created (step 3405 of FIG. 19).

The compiler uses these instructions to determine whether the translation from source code to object code will allow program execution to proceed on one processor (serial execution) or multiple processors (parallel execution). After object code is created, it is linked (using any appropriate linker) and executed. Results of parallelized compilation of parallel sections of code are compared with serialized compilation of parallel sections of code. This comparison may be performed automatically with the computer highlighting differences or it may be performed manually by the programmer. If results differ, then the programmer is aware of one or more errors in the parallel code. By viewing the calling graph, the programmer can specify the serialization of particular sections of parallel code, thus affording the opportunity to localize the error.

The invention claimed is:

1. A method of serializing sections of a parallel program, comprising the steps of:
    a) locating sections of said program that may be executed concurrently;
    b) displaying information representative of said sections and their interrelationships;
    c) selecting at least one of said sections for serialization, responsive to the displayed information;
    d) generating object code for the program providing for serial execution of said selected sections.

2. The method of claim 1, wherein the step b) includes the step of representing information of said sections and their interrelationships in the form of a tree graph.

3. The method of claim 2 wherein the program consists of subprograms and step b) further includes the steps of:
    representing subprograms as nodes on the tree graph;
    representing an edge from a node X to a node Y if the subprogram represented by node Y is called by the subprogram represented by node X at least once.

4. The method of claim 3 further comprising the steps of:
    e) compiling and executing the parallel program;
    f) executing the object code generated in step d) of claim 1;
    g) comparing the results obtained in step e) and step f.

5. The method of claim 4 further including a method of detecting a section of parallel code containing an error, comprising the step of repeating steps c) through g) until differing results are obtained in step g).

6. The method of claim 5 wherein displayed nodes are shaded in a first manner when serialization of an entire subprogram has been requested and nodes are shaded in a second manner when particular sections of a subprogram have been requested for serialization.

7. A system for assisting in the serialization of sections of a parallel program which may be used in a multiprocessor computer, said system comprising:
    a) locating means for locating sections of said program that may be executed concurrently;
    b) display means coupled to said locating means for displaying information representative of said sections and their interrelationships;
    c) selection means coupled to said display means for selecting at least one of said sections for serialization, responsive to the displayed information;
    d) means coupled to said selection means for generating object code for the program, said object code providing for serial execution of said selected sections.

8. The system of claim 7, wherein the information representative of said sections and their interrelationships is displayed in a tree structure format.

9. A method of locating an error in a parallel program, comprising the steps of:
    a) locating sections of said program that may be executed concurrently;
    b) displaying information representative of said sections and their interrelationships;
    c) selecting at least one of said sections for serialization, responsive to the displayed information;
    d) generating object code for the program providing for serial execution of said selected sections;
    e) compiling and executing the parallel program;
    f) executing the object code generated in step d);
    g) comparing the results obtained in step e) and step f);
    h) repeating steps c) through g) until the error has been localized.

10. The method of claim 9 wherein said program includes a plurality of subprograms and displayed nodes are shaded in a first manner when serialization of an entire subprogram has been requested and nodes are shaded in a second manner when only particular sections of a subprogram have been requested for serialization.

11. A method of locating an error in a parallel program, wherein the parallel program includes a plurality of subprograms, said method comprising the steps of:
    a) locating sections of said program that may be executed concurrently;
    b) displaying information representative of said sections and their interrelationships in the form of a tree graph, wherein the subprograms are represented as nodes on the tree graph and an edge is represented from a node X to a node Y if the subprogram represented by node Y is called by the subprogram represented by node X at least once;
    c) selecting at least one of said sections for serialization, responsive to the displayed information;
    d) generating object code for the program providing for serial execution of said selected sections;
    e) compiling and executing the parallel program;
    f) executing the object code generated in step d);
    g) comparing the results obtained in step e) to the results obtained in step f);
    h) repeating steps c) through g) until the error has been localized.

12. The method of claim 11 wherein displayed nodes are shaded in a first manner when serialization of an entire subprogram has been requested and nodes are shaded in a second manner when only particular sections of a subprogram have been requested for serialization.

* * * * *